United States Patent Office 3,367,990
Patented Feb. 6, 1968

3,367,990
EPOXY RESINS FORMED BY INTERACTING A DIGLYCIDYL ETHER OF A DIHYDRIC PHENOL, AN EPOXIDIZED NOVOLAC AND A DIHYDRIC PHENOLIC COMPOUND
Bart J. Bremmer, Midland, Mich., assignor to The Dow Chemical Company, Midland, Mich., a corporation of Delaware
No Drawing. Filed Oct. 9, 1963, Ser. No. 314,893
8 Claims. (Cl. 260—831)

ABSTRACT OF THE DISCLOSURE

This application is concerned with epoxy resins having an increased reactivity in the presence of a latent catalyst at an elevated temperature comprising (1) 10 to 35 parts by weight per hundred parts resin of a dihydroxy phenolic compound selected from the group consisting of 4,4'-dihydroxy diphenyl dimethyl methane, 4,4'-dihydroxy diphenyl sulfone, 4,4'-dihydroxy diphenyl methane, 4,4'-dihydroxy diphenyl oxide, 4,4'-dihydroxy biphenyl or hydroquinone and the nuclear chlorinated or brominated derivatives thereof and (2) an epoxide mixture of (a) from 15 to 89 parts by weight per hundred parts resin of the diglycidyl ether of a dihydroxy phenolic compound and (b) an epoxidized novolac.

---

This invention relates to a solid epoxy resin having utility in the preparation of laminates. More particularly, the invention concerns a normally solid, thermoplastic epoxy resin containing a polyfunctional epoxidized novolac having an increased reactivity without a significant degradation of physical properties.

High molecular weight thermoplastic epoxy resins having an epoxide equivalent weight in the range 450–5000 are used widely in coatings and to impregnate materials such as glass cloth which are converted to laminates. These resins are dissolved in a solvent then a catalyst is added and the solution used to produce prepregs for the laminates. The prepregs are made by passing the fabric through the solution then vaporizing the solvent in a B stage tower, leaving a dry, non-tacky, partially crosslinked prepreg. Several sheets of the prepreg are stacked in a press then heated under pressure to a temperature in the range 125–200° C. to effect the cure required to produce a laminate. If the rate at which the resin crosslinks and becomes thermoset is low, a portion of the resin may be squeezed out during the high pressure cure, resulting in a starved, inferior laminate as well as losing 25 percent or more of the resin.

Several expedients have been employed to overcome this problem. The impregnated fabric may be held in the B stage tower for a longer period of time to produce a higher B stage cure. This is undesirable for the reason that it reduces the productive capacity of the equipment. Another alternative is that of increasing the amount of catalyst used to produce the resin. This usually has the undesirable side effect of altering the polymer structure as reflected by an increase in epoxide equivalent weight and the Durrans softening point. High amine catalyst concentrations sometimes produce an undesirable darkening of the product. Also, the shelf life of the resin is shorter at the higher catalyst concentration and the resin may undergo a rapid increase in viscosity or gellation.

I have found that these problems can be overcome by substituting a polyfunctional epoxide having more than two functional groups for a part of the diepoxide compound used to produce the epoxy resin. The reactivity, i.e., the rate of cure, of the resin is increased by the polyfunctional epoxide without a significant increase in the epoxide equivalent weight and Durrans softening point.

High molecular weight epoxy resins of the type used in prepregs are produced by reacting an aromatic dihydroxy compound such as bisphenol A with a diepoxide such as the diglycidyl ether of bisphenol A in the presence of a catalyst such as triethylamine, producing long chain, substantially linear polyethers having hydroxyl groups along the chain. When a polyfunctional compound having more than two epoxide groups in the molecule is reacted with the dihydroxy compound, a non-linear, branched polyether is produced which undergoes cross-linking to become thermoset more readily than the linear polyethers.

The polyfunctional compounds which may be used in preparing these high reactivity resins are generally known as epoxidized novolac resins and may be represented by the following structural formula:

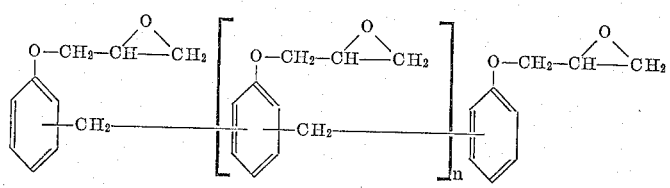

where the average value of $n$ is from 0.1 to about 5. The preferred epoxidized novolac has an average value of $n$ between about 1 and 2, i.e., the molecules contain an average of 3 to 4 oxirane groups.

Substantially linear thermoplastic epoxy resins may be produced by reacting about 22 parts by weight of bisphenol A with 78 parts of the diglycidyl ether of bisphenol A. An increase in reactivity is obtained when the resin contains as little as 1 part of the polyfunctional epoxidized novolac per hundred parts resin. Generally speaking, the greater the amount of diglycidyl ether which is replaced by the epoxidized novolac, the greater the reactivity of the resin. The physical properties of the cured resin are altered very little by the presence of a minor amount of the epoxidized novolac whereas resins having a major amount of the diepoxide of bisphenol replaced by the epoxidized novolac may be so highly crosslinked that gellation occurs. For this reason, it usually is desirable to limit the concentration of epoxidized novolac to about 50 parts per hundred parts resin when the novolac has an average of 3–4 oxirane groups per molecule.

In addition to resins containing the diglycidyl ether of bisphenol A (4,4'-dihydroxy diphenyl dimethyl methane) the epoxidized novolacs may be used in accordance with this invention in resins based on the diglycidyl ethers of other aromatic dihydroxy compounds such as hydroquinone, 4,4'-dihydroxy biphenyl, 4,4'-dihydroxy diphenyl oxide and 4,4'-dihydroxy diphenyl sulfone.

The dihydroxy aromatic compound which is reacted with the polyepoxides may be bisphenol A (4,4'-dihydroxy diphenyl dimethyl methane), 4,4'-dihydroxy diphenyl sulfone, 4,4'-dihydroxy diphenyl methane, 4,4'- dihydroxy diphenyl oxide, 4,4'-dihydroxy biphenyl or hydroquinone. In addition to these compounds, their nuclear halogenated derivatives such as tetrabromobisphenol A may be used to obtain a resinous product having better flame-retardant properties.

Any of the well-known catalysts for producing epoxy resins may be used to prepare these resins having increased reactivity. Suitable catalysts include triethylamine, tri-n-propylamine, tri-n-butylamine, N-methyl morpholine, etc.

The following examples illustrate the effect of a polyfunctional epoxide on the reactivity of an epoxy resin.

Example 1

A reaction vessel was charged with 420 parts by weight of the diglycidyl ether of bisphenol A and 293 parts of tetrabromobisphenol A. The mixture was heated to 104° C. while being stirred and held at that temperature until all of the tetrabromobisphenol A was in solution. At that time the mixture was cooled to about 70° C. and 1.1 parts by weight of triethylamine was added. The mixture was then heated to 100–120° C. whereupon an exothermic reaction occurred, increasing the temperature to 135–145° C. The temperature was then raised to 165° C. and held at that level for 2 hours. After subjecting the product to a slight vacuum to remove volatile materials, the resin was poured from the reactor and allowed to cool.

Examples 2 and 3

The same procedure was followed here as in Example 1, the sole difference being in the substitution of an epoxidized novolac for a part of the diglycidyl ether of bisphenol A. In Example 2, 20 parts by weight of the epoxy novolac were substituted for a corresponding amount of the diglycidyl ether whereas 40 parts were substituted in Example 3.

Examples 4, 5 and 6

Several resins were prepared using the procedure set out in Example 1 and having the following concentrations of reactants expressed as weight percent:

|   | Examples | | |
|---|---|---|---|
|   | 4 | 5 | 6 |
| Diglycidyl ether of bisphenol A | 78.4 | 74.6 | 70.8 |
| Bisphenol A | 21.6 | 21.6 | 21.6 |
| Epoxidized Novolac | 0 | 3.8 | 7.6 |
|   | 100.0 | 100.0 | 100.0 |

The epoxidized novolac used in these examples was one according to the formula set out hereinbefore and having an average value of $n$ equal to 1.6.

The reactivities of these resins were compared on the basis of viscosity increase. A 60 percent solution of the resin in diethylene glycol n-butyl ether, catalyzd with about 0.3 percent benzyldimethylamine was held at 135° C. for 100 minutes. The increase in the viscosity of the solution over that 100 minute interval was taken as a measure of reactivity. The results of those measurements are listed in Table I along with the epoxide equivalent weights (EEW), and Durrans softening points of the resins.

TABLE I.—EFFECT OF EPOXIDIZED NOVOLAC ON REACTIVITY OF EPOXY RESIN

| Ex. No. | Epoxy Novolac, Percent | Viscosity Increase, Centistokes | EEW | Durrans S.P., °C. |
|---|---|---|---|---|
| 1 | 0 | 4.63 | 668 | 92.5 |
| 2 | 2.8 | 7.30 | 687 | 95 |
| 3 | 5.6 | 8.17 | 651 | 94 |
| 4 | 0 | 11.01 | 499 | 76.4 |
| 5 | 3.8 | 13.61 | 491 | 76.2 |
| 6 | 7.6 | 19.59 | 487 | 78.4 |

The data in Table I clearly illustrate the increased reactivity produced by a minor amount of epoxy novolac in the resin without an appreciable change in the epoxide equivalent weight or hardness, i.e., Durrans softening point. These results may be contrasted with those reported in Table II where greater reactivity was obtained by increasing the catalyst content of a resin produced in accordance with the procedure and using the same reactants as in Example 1.

TABLE II.—EFFECT OF CATALYST CONTENT ON EPOXY RESIN

| Ex. No. | Catalyst, percent | Viscosity Increase, Centistokes | EEW | Durrans S.P., °C. |
|---|---|---|---|---|
| 7 | 0.154 | 4.69 | 702 | 93.1 |
| 8 | 0.224 | 5.08 | 720 | 95.6 |
| 9 | 0.282 | 5.98 | 735 | 97.1 |
| 10 | 0.322 | 6.47 | 754 | 100.2 |

These data reveal a modest increase in reactivity as evidenced by the viscosity increase and a corresponding increase in epoxide equivalent weight and Durrans softening point.

The reactivity of an epoxy resin containing epoxidized novolac is further illustrated by the data of Table III. The epoxy resin used in this series of samples was prepared by a procedure similar to that in Example 4, using the same reactants. The Durrans softening points show a slight but gradual increase with increasing novolac content. The reactivity again is evaluated on the basis of the increase in viscosity. These tests were made with solutions at 150° C. and in the presence of both benzyldimethylamine and dicyandiamide catalysts so that gellation is reached at a considerably shorter time than 100 minutes. The first viscosity increase which was determined was the time required for the mixture to reach a viscosity of 50 centistokes (cks.). Finally, the length of time required for gellation of the resin was recorded.

TABLE III.—EFFECT OF EPOXIDIZED NOVOLAC ON REACTIVITY OF EPOXY RESIN

| Sample No. | Epoxy Novolac, percent | Viscosity Increase, minutes to— | | Durrans S.P., °C. |
|---|---|---|---|---|
|   |   | 50 cks. | Gellation |   |
| 11 | 0 | 27.6 | 51.6 | 75 |
| 12 | 2.9 | 27.3 | 50.1 | 75 |
| 13 | 4.1 | 26.0 | 44.0 | 76 |
| 14 | 5.9 | 24.8 | 43.7 | 78 |
| 15 | 7.6 | 23.6 | 37.9 | 79.5 |
| 16 | 11.8 | 20.7 | 35.8 | 82 |

In the manufacture of laminates by pressing multiple layers of prepreg at an elevated temperature, it is desirable for about 6–14 percent of the resin contained in the prepreg to squeeze out during the pressing operation to insure uniformity in the laminate. The laminate may contain air pockets if less than about 6 percent of the resin is removed whereas the laminate will have areas deficient in resin if more than about 14 percent is squeezed out. Since the resin which is removed in this step is thermoset, it cannot be salvaged for reuse, therefore all resin removed in excess of that necessary to produce uniformity in the laminate, represents an outright loss. A series of tests were conducted which illustrate the effect of epoxidized novolac on the loss of resin in the preparation of laminates.

Sheets of glass cloth having a Volan A finish were impregnated with an epoxy resin by passing the cloth through a solution of the resin at a velocity of about 0.8 ft./sec., then passing the cloth through an oven at 300–312° F. for a period of 6 minutes to remove solvent and produce a B stage prepreg containing 38–42 percent resin.

Laminates were produced by placing 6 sheets of the prepreg 6 inches wide and 9 inches long in a press heated to 350° F. The initial pressure of 20 lb./sq. in. was held on the laminate for 2 minutes, then the pressure was increased to 500 lb./sq. in. over a period of 6 seconds and held at that pressure for 8 minutes. The resin which flowed out of the laminate was trimmed off and weighed so that the resin flow or loss could be calculated.

The resin solution used to impregnate the glass fabric had the following composition:

| | Parts |
|---|---|
| Epoxy resin | 100 |
| Dicyandiamide | 4 |
| Benzyldimethylamine | 0.2 |
| Dimethylformamide | 20 |
| Ethylene glycol methyl ether | 10 |
| Acetone (to produce a Gardner viscosity of H–I) | 38–40 |

Table IV presents the weight percent resin loss for epoxy resins containing up to 11.8 weight percent of an epoxidized novolac having an average value of $n$ equal to 1.6.

TABLE IV.—RESIN LOSS DURING LAMINATION

| Epoxy novolac, percent: | Resin loss, percent |
|---|---|
| 0 | 22–25 |
| 2.9 | 23–27 |
| 4.1 | 22–23 |
| 8.2 | 12–14 |
| 11.8 | 4–6 |

From these results it can be seen that epoxy novolac concentrations up to about 4 weight percent had little effect on resin loss from these prepregs whereas concentrations above about 12 weight percent might not permit sufficient flow to produce a uniform laminate. Accordingly, the preferred concentration of this epoxidized novolac is between about 8 and 12 weight percent. The optimum concentration of epoxy novolac will be affected by many variables such as curing temperature and pressure, catalyst concentration, the softening point of the resin, the value of $n$ for the epoxy novolac, etc. In general, the reactivity of epoxy resins may be increased by as little as 1 part of the epoxidized novolac per 100 parts resin and as much as 50 phr. may be used without producing rapid gellation. Resins based on bisphenol A and the diglycidyl ether of bisphenol A may contain as little as 10 phr. and as much as 35 phr. of the bisphenol A. The range of the concentration of diglycidyl ether of bisphenol A is 15–89 phr., the exact amount used being that which combines with the epoxidized novolac and the bisphenol A to produce 100 parts of the resin. These quantities will vary, of course, with other reactants having equivalent weights different from those of these reactants.

In addition to overcoming some of the problems with the lower reactivity resins, these novel resins may be used to advantage in fluidized coating operations. Thus, the resin may be used either in solution or as a particulate solid.

I claim:

1. An epoxy resin having an increased reactivity in the presence of a latent catalyst at an elevated temperature comprising (1) 10 to 35 parts by weight per hundred parts resin of a dihydroxy phenolic compound selected from the group consisting of 4,4'-dihydroxy diphenyl dimethyl methane, 4,4'-dihydroxy diphenyl sulfone, 4,4'-dihydroxy diphenyl methane, 4,4'-dihydroxy diphenyl oxide, 4,4'-dihydroxy biphenyl or hydroquinone and the nuclear chlorinated or brominated derivatives thereof and (2) an epoxide mixture of (a) from 15 to 89 parts by weight per hundred parts resin of the diglycidyl ether of a dihydroxy phenolic compound and (b) an epoxidized novolac having the general formula:

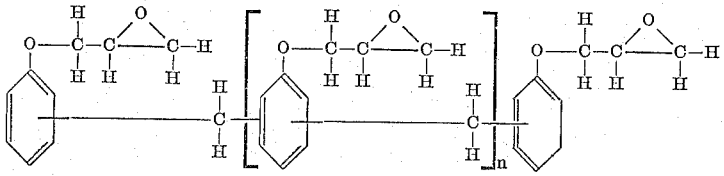

where $n$ is from 0.1 to about 5, the concentration of said epoxidized novolac being in the range 1–50 parts per hundred parts resin.

2. An epoxy resin according to claim 1 wherein said dihydroxy phenolic compound is 4,4'-dihydroxy diphenyl dimethyl methane, said diglycidyl ether of a dihydroxy phenolic compound is the diglycidyl ether of 4,4'-dihydroxy diphenyl dimethyl methane and said epoxidized novolac has a value of $n$ between about 1 and 2.

3. A resin according to claim 2 wherein said resin contains between about 8 and about 12 parts of said epoxidized novolac per hundred parts resin.

4. An epoxy resin according to claim 2 wherein said dihydroxy phenolic compound is tetrabromo-4,4'-dihydroxy diphenyl dimethyl methane.

5. A prepreg useful in the preparation of laminates comprising a fibrous material impregnated with a resin as described in claim 1 together with a latent catalyst.

6. A prepreg useful in the preparation of laminates comprising a fibrous material impregnated with a resin as described in claim 2, together with a latent catalyst.

7. A method of producing a B stage epoxy resin having increased reactivity comprising reacting 10 to 35 parts by weight per hundred parts resin of a dihydroxy phenolic compound selected from the group consisting of 4,4'-dihydroxy diphenyl dimethyl methane, 4,4'-dihydroxy diphenyl sulfone, 4,4'-dihydroxy diphenyl methane, 4,4'-dihydroxy diphenyl oxide, 4,4'-dihydroxy biphenyl or hydroquinone and the nuclear chlorinated or brominated derivatives thereof and an epoxide mixture of from 15 to 89 parts by weight per hundred parts resin of the diglycidyl ether of a dihydroxy phenolic compound and from 1 to 50 parts by weight per hundred parts resin of an epoxidized novolac having an average number of epoxy groups per molecule between 2.1 and 7, in the presence of a catalytic amount of a tertiary amine to produce a thermoplastic polyether, then adding a latent catalyst and heating said resin for a period of time sufficient to produce partial crosslinking of said polyether to said B stage.

8. A method of producing a B stage epoxy resin having increased reactivity comprising reacting from 10 to 35 parts of 4,4'-dihydroxy diphenyl dimethyl methane, from 15 to 89 parts of the diglycidyl ether of 4,4'-dihydroxy diphenyl dimethyl methane and from 1 to 50 parts of an epoxidized novolac having between 2.1 and 7 epoxy groups per molecule, said reaction being catalyzed by an aliphatic tertiary amine to produce a thermoplastic polyether, thereafter adding a latent catalyst and heating said polyether to effect a partial cross-linking thereof to said B stage.

References Cited

UNITED STATES PATENTS 3,051,681   8/1962   Partansky _____ 260—830
3,264,369   8/1966   Ephraim _____ 260—831

MURRAY TILLMAN, Primary Examiner.

PAUL LIEBERMAN, Assistant Examiner.